Nov. 5, 1957  D. T. AYERS, JR  2,811,836
BOOSTER BRAKE MECHANISM
Filed Nov. 27, 1953  2 Sheets-Sheet 2
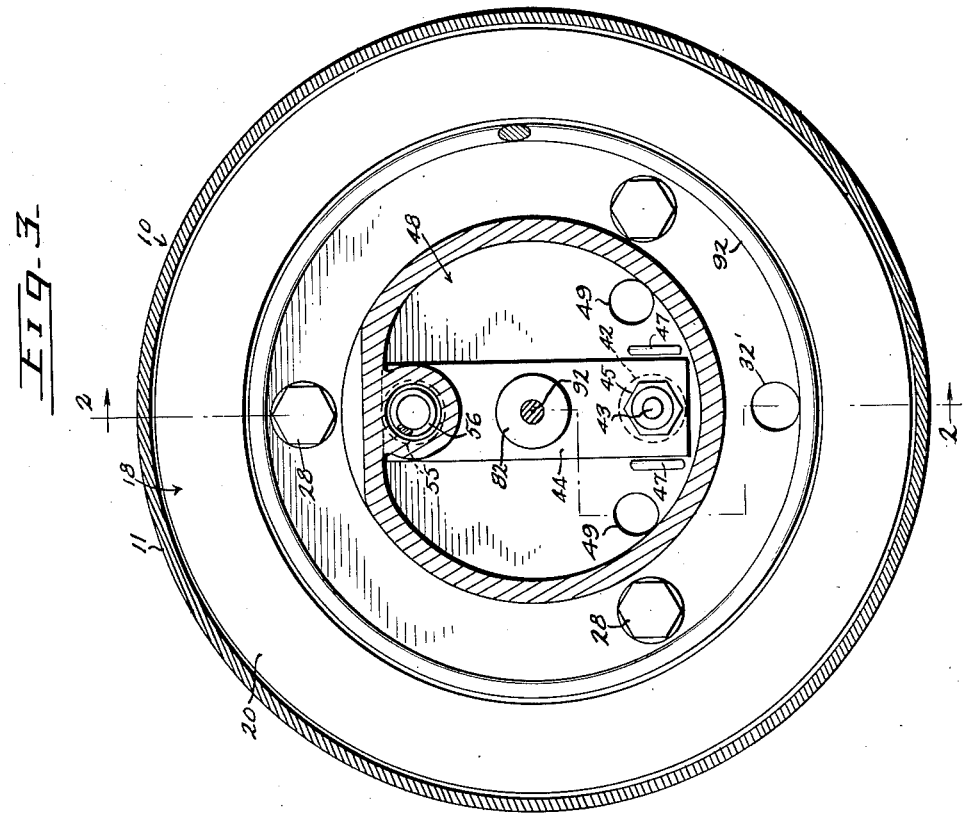
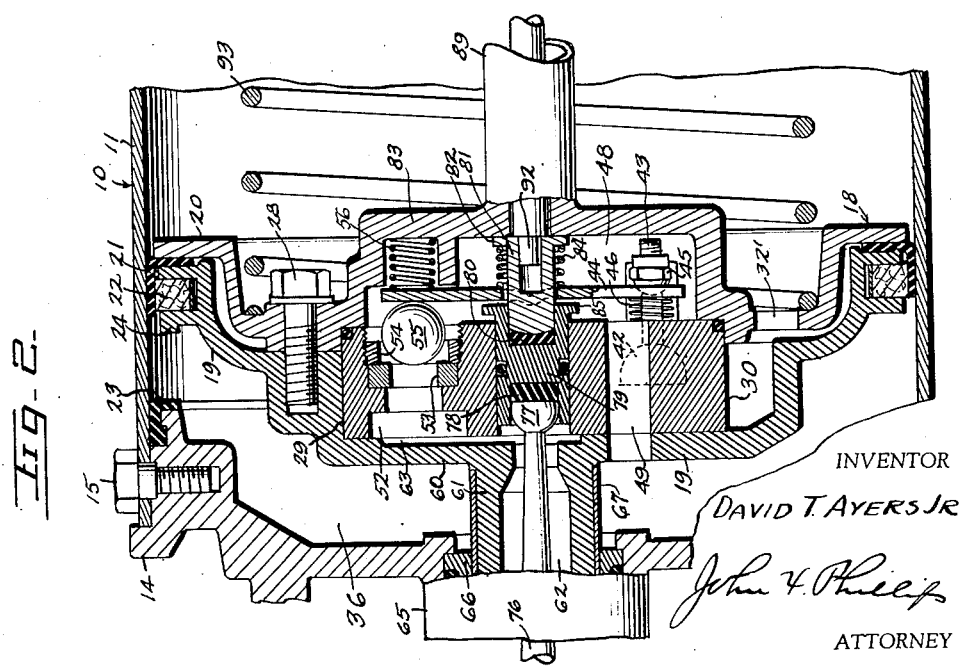
INVENTOR
DAVID T. AYERS JR
ATTORNEY

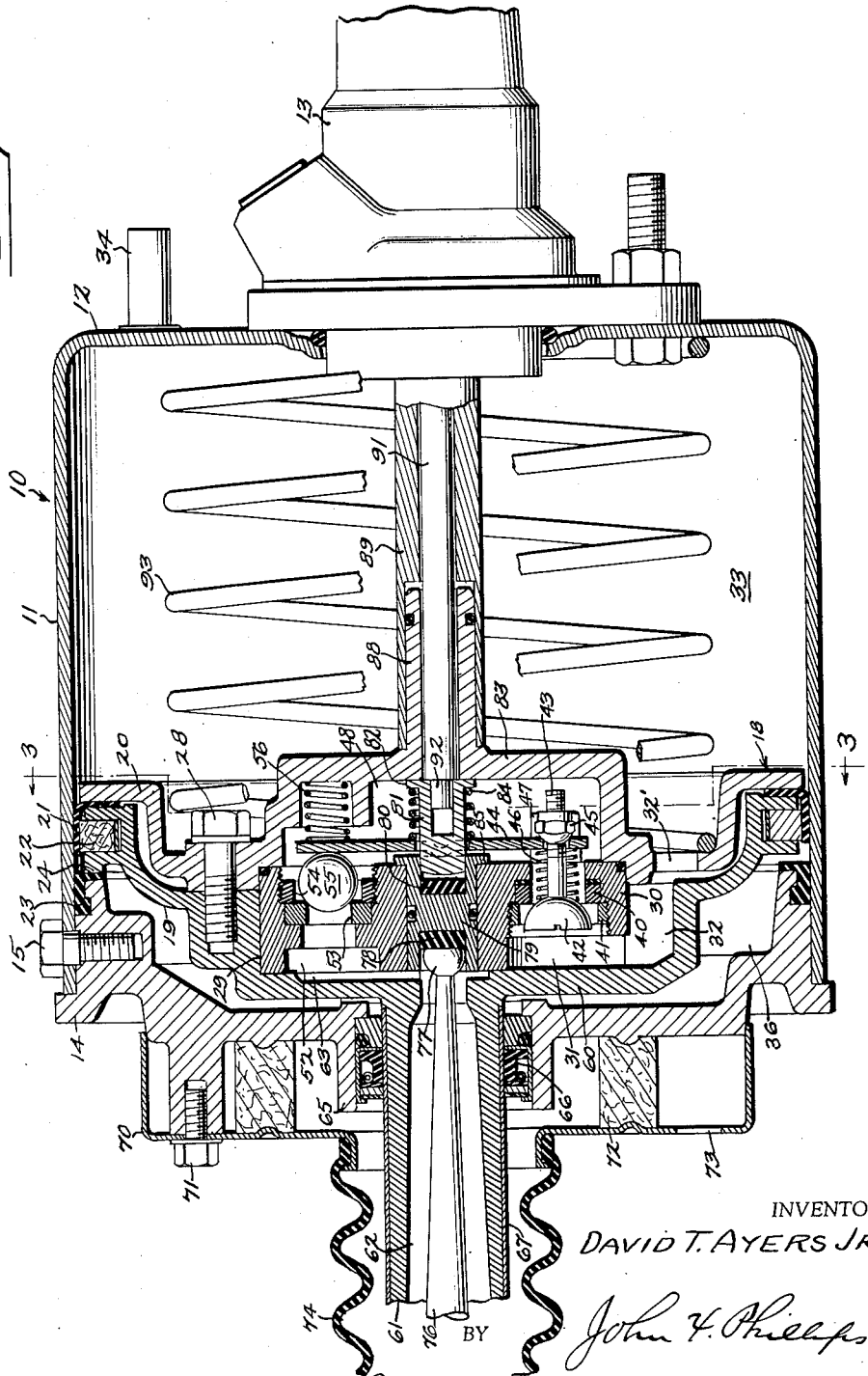

United States Patent Office 2,811,836
Patented Nov. 5, 1957

2,811,836

BOOSTER BRAKE MECHANISM

David T. Ayers, Jr., Birmingham, Mich., assignor to Kelsey-Hayes Company, a corporation of Delaware Application November 27, 1953, Serial No. 394,682

14 Claims. (Cl. 60—54.6)

This invention relates to booster brake mechanisms for motor vehicles, and more particularly to a booster motor having an improved control valve mechanism.

It has been proposed to provide a brake booster motor having a pressure responsive unit therein dividing the motor to form a pair of chambers one of which is a constant pressure chamber and the other of which is a variable pressure chamber and to control pressures in the latter chamber by a valve mechanism including an operating device in the form of a rocking lever. Booster motors of this type usually utilize the intake manifold of a motor vehicle engine as the source of pressure differential, and in the off positions of the parts, the pressure responsive unit is vacuum suspended. Motors of the type referred to usually provide a normally open vacuum valve affording communication between the motor chambers to vacuum suspend the pressure responsive unit, and a normally closed valve controlling communication between the atmosphere and the variable pressure chamber of the motor. The air valve is biased to closed position against the pressure of the air. The lever for operating the valves is operable by a rod connected to the brake pedal. Upon initial operation of such pedal the valve operating lever fulcrums on the air valve to first close the vacuum valve, after which the lever fulcrums on the vacuum valve to release the air valve for opening movement to admit air into the variable pressure chamber of the motor.

Booster motors of this type usually mount the valve mechanism at the side of the pressure responsive unit corresponding to the variable pressure chamber, and air is supplied by means of a helical flexible hose arranged in the constant pressure chamber of the motor. One end of such hose communicates with the air valve seat and the other end communicates with the atmosphere through the motor casing, and the helical form and flexibility of the hose or pipe permits free movement of the pressure responsive unit in the motor.

Devices of the character referred to are fully operative and advantageous in a number of respects from a practical standpoint. However, the use of a flexible air hose does not represent the best engineering practice for obvious reasons. Moreover, the mounting of the valve operating lever and associated elements externally of the pressure responsive unit requires care in the assembling of the unit in the motor to prevent damaging and disarranging of the parts.

An important object of the present invention is to provide a booster mechanism of the character referred to having a lever operated valve mechanism housed wholly within the pressure responsive unit of the motor so that the latter readily may be assembled relative to the motor casing without danger of damaging or displacing any of the valve parts or the operating means therefor.

A further object is to provide such a mechanism which is particularly characterized by ruggedness and capability of long efficient operation without servicing.

A further object is to provide such an apparatus wherein the use of a flexible air hose is eliminated by a novel arrangement of parts for supplying air to the air valve.

A further object is to provide such a device which lends itself readily for use with the type of booster brake mechanism wherein a portion of the work in displacing fluid from the master cylinder is performed by the booster motor while the other part of the work is performed by the pressure of the operators' foot on the brake pedal.

Other objects and advantages of the invention will become apparent during the course of the following description.

In the drawings I have shown one embodiment of the invention. In this showing:

Figure 1 is a sectional view through a booster motor mechanism, parts being broken away and parts being shown in elevation, the elements of the mechanism being shown in off position;

Figure 2 is a similar view, the air cleaner and associated parts being omitted, showing the parts in motor energizing positions, the section differing somewhat from Figure 1 to show a fluid duct leading to the variable pressure chamber and the section being taken substantially on line 2—2 of Figure 3; and Figure 3 is a section substantially on line 3—3 of Figure 1.

Referring particularly to Figure 1, the numeral 10 designates a booster motor as a whole comprising a pressed cylinder 11 having an integral head 12 at one end thereof carrying what is now a conventional type of master cylinder 13 from which fluid is supplied in the usual manner to the lines leading to the brake cylinders (not shown). The other end of the cylinder 11 is closed by a head 14 shown in the present instance as a casting and secured to the cylinder 11 by screws 15.

A pressure responsive unit indicated as a whole by the numeral 18 is reciprocable in the cylinder 11. This unit is shown as comprising a pair of cast body members 19 and 20 between the adjacent peripheral edges of which is clamped the inturned flange of a cup 21 urged outwardly into engagement with the cylinder by any suitable expanding means 22. The head 14 and cylinder 11 cooperate to hold in position a seal and bumper 23 engageable by lugs 24 preferably formed integral with the body member 19. The bumper seals the head 14 and cylinder 11 against leakage and limits movement of the pressure responsive unit 18 to its off position shown in Figure 1 and silences such movement.

The body members 19 and 20 are secured together by screws 28, and they cooperate to form a bore 29 in which is arranged a valve housing 30. This housing is provided at one side of the axis thereof with a vacuum chamber 31 communicating with a passage 32 in the body member 19 and then through a port 32' in the body member 20 with one chamber 33 of the motor, which will be the constant pressure chamber. Such chamber, in the case of a vacuum motor, may be connected to a duct leading to the source of vacuum through a suitable nipple 34. The end of the cylinder 11 at the opposite side of the pressure responsive unit, indicated by the numeral 36, is the variable pressure chamber of the motor to which air is supplied in a manner to be described.

A vacuum valve seat 40 is carried by the valve body 30 and retained in position by a keeper 41, and the valve seat 40 is engageable by a hemispherical vacuum valve 42 carried by a stem 43 projecting through an operating lever 44, further described below. The stem 43 is universally mounted relative to the lever 44 and is adjustable relative thereto by a nut 45 the side of which engaging the lever 44 is substantially hemispherical as shown. Guides 47 carried by the valve body 30 prevent swinging of the lever 44 in its own plane. A spring 46 is interposed between the valve 42 and lever 44 to maintain the nut 45 in engagement with the lever. The vacuum valve 42 is open in the off position of the parts as shown in Figure 1, in which case the chamber 31 communicates through valve seat 40 with a control chamber 48 formed in the body member 20. As shown in Figures 2 and 3, the chamber 48 communicates with the variable pressure chamber 36 through ports 49 extending through the valve body 30 and through the body member 19. Accordingly, any pressures present in the chamber 48 will always be duplicated in the variable pressure chamber 36.

The valve body 30 is provided with an air chamber 52 adapted to communicate with the control chamber through a valve seat 53 held in position by a retainer 54 and engaged by a ball valve 55 which is normally seated in the off position of the parts. A biasing spring 56 engages the lever 44 at the end opposite the vacuum valve, and such end of the lever engages the ball valve so that the force of the spring 56 tends to maintain the valve 55 on its seat. It will become apparent that atmospheric pressure is always present in the chamber 52. When the parts are in the off positions shown in Figure 1, vacuum is present in the chamber 48. Accordingly, differential pressures tend to unseat the valve 55, and the spring 56 is of sufficient strength to overcome the air pressure tending to unseat the valve 55.

The body member 19 is provided with an end wall 60 formed integral with an axially extending sleeve 61 the interior of which forms an air chamber 62 communicating with the chamber 52 through a radial groove 63 formed in the wall 60.

The head 14 is provided with an axially extending hub 65 carrying any suitable type of bearing and sealing means 66 in which is slidable a relatively thin sleeve 67, preferably formed of smooth stainless steel, pressed on the sleeve 61.

A cap 70 is fixed to the head 14 by screws 71 and cooperates with the head to maintain in position an annular air cleaner 72. Air is supplied to the space outwardly of such cleaner through a port 73, and from the interior of the cleaner, air is adapted to flow through a collapsible boot 74 secured at one end to the cap 70, as shown in Figure 1.

The valve mechanism is operable by a rod 76 connected for operation by the vehicle brake pedal. The boot 74 is connected to the rod 76 beyond the end of the sleeve 61, so that air within the boot 74 may flow freely outwardly to the end of the sleeve 61, thence into chamber 62. This particular feature forms no part of the present invention and need not be fully illustrated.

The inner end of the rod 76 carries a head 77 engageable against a cushion 78 arranged in a recess in the adjacent end of a spool 79 slidable in the valve body 30 axially thereof.

The other end of the spool 79 has a cushion 80 therein normally spaced from the adjacent end of a thimble 81 having a flange 82 normally seating against the adjacent wall 83 of the body member 20. A spring 84 is interposed between the flange 82 and the central portion of the lever 44, accordingly biasing this lever for movement toward the left to tend to maintain the vacuum valve 42 unseated. The spring 84, through the lever 44, also biases the spool 79 to normal off position, the spool having an end flange 85 engaging against the valve body 30 under such conditions.

The body member 20 has an axial sleeve extension 88 fitting within the recessed adjacent end of a plunger sleeve 89 which extends into the master cylinder 13 to displace fluid therefrom when the motor 10 is energized. A rod 91 is slidable in the plunger sleeve 89 and extends also into the master cylinder 13 to form a pedal operated displacing member cooperable with the sleeve 89 when the brake pedal is depressed, in a manner which will be apparent. The left-hand end of the plunger rod 91 is reduced as at 92 to fit into the adjacent end of the thimble 81, thus forming a shoulder on the plunger rod 91 engageable with the thimble 81 to move the latter member toward the left under conditions to be described. It will be noted that the left-hand end of the thimble 81 is spaced from the cushion 80 in the normal off positions of the parts shown in Figure 1.

In accordance with the usual practice, the pressure responsive unit 18 is biased to its off position by a spring 93. One end of this spring engages the body member 20 and the other end engages the cylinder head 12.

Operation

The parts normally occupy the positions shown in Figure 1. The vacuum valve 42 being open, the chamber 48 will be in communication with the source of vacuum through valve seat 40, chamber 31, passage 32 and port 32' to the motor chamber 33, which is always in communication with the source. The chamber 52 is always in communication with the atmosphere through the space 62, thence through the boot 74 and the air cleaner 72. Accordingly, differential pressures tend to unseat the air valve 55, and the spring 56 is strong enough to slightly overrule such differential pressures. Accordingly, the valve 55 is normally arranged on its seat. Since the chamber 48 (Figure 2) is in fixed communication with the motor chamber 36 through passage 49, the pressure responsive unit 18 will be vacuum suspended.

When the brakes are to be applied, the brake pedal (not shown) will be depressed to move the rod 76 toward the right from the position shown in Figure 1. This action moves the thimble 79 initially within the limits of the space between the cushion 80 and spool 81, and accordingly no movement will be imparted to the plunger rod 91. Such movement, however, will cause the right-hand end of the spool 79 to engage the slightly bulged portion of the lever 44 intermediate the ends thereof (shown in dotted lines in Figures 1 and 2) to move the central portion of the lever 44 toward the right. The lower end of the lever 44 will move to close the vacuum valve 42, the lever 44 fulcruming at its point of contact with the air valve 55. Inasmuch as movement is imparted to the lever 44 substantially centrally of the length thereof, the initial movement referred to will cause the valve 42 to move twice as far as the center point of the lever to which movement is imparted.

The action referred to closes the vacuum valve, and this valve can move no further to the right than its closed position, whereupon further movement imparted to the lever 44 will cause this member to fulcrum about the hemispherical face of the nut 45 and effect movement of the upper end of the lever 44, as viewed in Figure 1, toward the right. This action immediately relieves the loading of the spring 56 against the air valve 55, and this valve will be moved from its seat by air pressure back of the valve.

The closing of the vacuum valve 42 disconnects the chamber 48 from the motor chamber 33, thus disconnecting the motor chambers 33 and 36 from each other. The opening of the air valve 55 admits air into the chamber 48, and this air flows through passage 49 (Figure 2) into the motor chamber 36. Differential pressure will now move the pressure responsive unit 18 toward the right against the tension of the return spring 93 to move the plunger sleeve 89 into the master cylinder to displace fluid therefrom.

The foregoing actions take place without transmitting forces from the spool 79 to the plunger 91. The initial movement described above takes place with the flange 82 of the thimble 81 engaging the wall 83 of the body member 20. Accordingly, the thimble 81 tends to run ahead of movement of the pedal operated rod 76 and spool 79. Upon the generation of a predetermined pressure in the master cylinder, however, the plunger rod 91 will be moved toward the left into firm engagement with the pad 80, and hydraulic pressures accordingly will be reacted back through the rod 91, thimble 81, spool 79 and rod 76. This action, of course, will move the flange 82 to the left, slightly out of engagement with the wall 83, and the reaction forces felt by the operator in the pedal will be in proportion to master cylinder pressures, the ratio being that between the effective areas of the plunger sleeve 89 and plunger rod 91, as will be apparent.

The valve mechanism obviously provides a follow-up action of the pressure responsive unit 18 relative to the rod 76. Whenever movement of this rod is stopped, an extremely slight additional movement of the pressure responsive unit 18 toward the right will cause the air valve seat 53 to engage the ball 55 to stop the admission of additional air into the chamber 48. Thus the valves will return to a lap position, and any tendency to overrun such position will result in the cracking of the vacuum valve 42 to immediately exhaust air from the chamber 48, thus instantly arresting movement of the parts.

After the motor has been energized to build up pressure in the master cylinder to a predetermined point, the ratio of the pressure of the hydraulic fluid to the energization of the motor will increase, thus tending to retard movement of the pressure responsive unit 18. Thereafter, foot applied pressures will tend to cause the spool 79 to run ahead of the motor, and the cushion 80 will move the thimble 81 toward the right to bring the flange 82 solidly into engagement with the wall 83, such position of the parts being shown in Figure 2. Thereafter, foot applied pressures will assist the pressure responsive unit 18 in generating master cylinder pressures, and the plunger sleeve 89 and plunger rod 91 will move as a unit.

When the brake pedal is released to release the brakes, the spring 84 acts against the lever 44 centrally thereof to transmit force to the spool 79 to return it from the position shown in Figure 2 to the position in Figure 1. The force of the spring 84 obviously unseats the vacuum valve 42 while the spring 56 acts against the lever 44 to seat the valve 55. Accordingly, the chamber 48 will be disconnected from the atmosphere and will again communicate with the chamber 33 of the motor, and since the chamber 48 is in fixed communication with the motor chamber 36, air will be evacuated from such chamber. The return spring 93 will quickly return the pressure responsive unit to the off position shown in Figure 1, and this unit again will be vacuum suspended.

The present invention provides a two-part pressure responsive unit comprising members 19 and 20 which cooperate to form the bore 29 for receiving the valve body 30. This body accordingly will be retained in position internally of the pressure responsive unit upon the assembly of the body members 19 and 20. Before insertion of the valve body, the valve seats 40 and 53 will be inserted in the positions shown and will be fixed in such positions by their respective keepers 41 and 54 which quickly and easily may be screwed into retaining position.

Thus it will be apparent that the device may be quickly and easily assembled and all moving parts of the valve mechanism will be completely housed within the pressure responsive unit 18 instead of being arranged at one side of such unit, as in a number of prior constructions. It also will be apparent that the present construction provides within the pressure responsive unit the air chamber 52, the vacuum chamber 31 and the control chamber 48 which is always in communication with the variable pressure motor chamber 36. Thus the construction effectively provides for the vacuum suspending of the unit 18 in the off positions of the parts. Particular attention is also invited to the fact that the arrangement of parts provides for the effective maintenance of the air chamber 52 in communication with the atmosphere through a convenient air cleaner without the use of spiral flexible hoses employed in earlier constructions.

The present construction therefore is superior as to its features of assembly since all valve parts and the operating means therefor are housed within the unit 18, thus making it unnecessary to exercise care in the assembly of the unit 18 relative to the motor cylinder and head 14 to prevent injury or disarrangement of the parts of the valve mechanism, as sometimes has occurred in assembling of mechanisms of the prior type referred to above. It also will be apparent that the construction is not dependent upon the repeated flexing of a hose and the necessity for maintaining leakproof joints at the ends of such element.

If a failure of power for the apparatus should occur, full manual operation is possible since it merely is necessary to pedal-operate the rod 76, move the spool 79 to take up play between the cushion 80 and thimble 81, and then transmit direct foot-generated pressures to the plunger sleeve 89 and plunger rod 91 to displace fluid from the master cylinder.

It is to be understood that a preferred form of the invention has been illustrated, but that the scope of the invention is defined in the appended claims.

I claim:

1. A fluid motor comprising a casing, a pressure responsive unit therein dividing it into a pair of chambers, means for connecting one of said chambers to a source of relatively low pressure, said pressure responsive unit having therein a control chamber in fixed communication with the other motor chamber, a high pressure chamber communicating with a source of relatively high pressure and a low pressure chamber communicating with said one motor chamber, and a valve mechanism for controlling communication of said control chamber with said high pressure chamber and said low pressure chamber, said valve mechanism comprising a high pressure valve seat, a first valve engageable with such seat, a low pressure valve seat, a second valve engaging such seat, and a lever engaging said valves and biased to a position closing said first valve and opening said second valve, and means for applying an operating force to said lever, said valve mechanism being housed wholly within said pressure responsive unit with said lever arranged in said control chamber.

2. A fluid pressure operated motor comprising a casing, a pressure responsive unit movable therein and dividing said casing into a pair of chambers, said unit having therein a control chamber, a relatively high pressure chamber, and a relatively low pressure chamber communicating with one of said motor chambers, means for connecting said one motor chamber to a source of relatively low pressure, means for supplying relatively high pressure to said relatively high pressure chamber, and a valve mechanism housed wholly within said pressure responsive unit for controlling communication of said control chamber with said high and low pressure chambers, said valve mechanism comprising a pair of valve seats having openings therethrough communicating respectively with said high and low pressure chambers, a first valve engageable with the seat of said high pressure chamber, a second valve engageable with the seat of said low pressure chamber, a lever in said control chamber having end portions engaging said valves, means biasing said lever for bodily movement in one direction to close said first valve and open said second valve, and means for applying a force to said lever against said biasing means to positively close said second valve, said first valve being movable by pressure in said high pressure chamber when said biasing means is overcome to connect the latter chamber with said control chamber.

3. Apparatus constructed in accordance with claim 2 wherein the means for moving said lever against its biasing means comprises a spool axially slidable in said pressure responsive unit, and a rod for axially moving said spool.

4. A booster brake mechanism comprising a master cylinder, a fluid pressure operated motor having a casing, a pressure responsive unit movable therein and dividing said casing into a pair of chambers, a hydraulic fluid displacing plunger connected to said unit and projecting into said master cylinder, said unit having therein a control chamber, a relatively high pressure chamber, and a relatively low pressure chamber communicating with one of said motor chambers, means for connecting said one motor chamber to a source of relatively low pressure, means for supplying relatively high pressure to said high pressure chamber, a valve mechanism housed within said pressure responsive unit for controlling said motor, said valve mechanism comprising a pair of valve seats having openings therethrough respectively communicating with said high and low pressure chambers, a first valve engageable with the seat of said high pressure chamber, a second valve engageable with the seat of said low pressure chamber, a lever having end portions engaging said valves, means biasing said lever for bodily movement in one direction to close said first valve and open said second valve, said control chamber being in fixed communication with the other casing chamber, a spool axially slidable in said plunger and movable into engagement with said lever to bodily move the latter, a rod engaging said spool to move it, and a fluid displacing rod axially slidable in said plunger means and having one end subject to hydraulic pressure in said master cylinder, the other end of said rod having lost motion connection with said spool to transmit thereto hydraulic pressures acting against said fluid displacing rod after said motor has been energized.

5. A fluid motor comprising a casing, a pressure responsive unit therein dividing said casing to form a pair of chambers, means for connecting one of such chambers to a source of vacuum, said pressure responsive unit comprising a pair of body members cooperating to form an internal bore, a valve body in said bore, said valve body and one of said body members cooperating to form an air chamber communicating with the atmosphere and a vacuum chamber communicaing with said one chamber of said motor, said pressure responsive unit being further provided internally thereof with a control chamber, an air valve seat and a vacuum valve seat carried by said valve body in communication respectively with said air chamber and said vacuum chamber, an air valve engaging said air valve seat, a vacuum valve engaging said vacuum valve seat, a lever in said control chamber engaging said valves, biasing means engaging said lever to bias said air valve to closed position and to bias said vacuum valve to open position, said control chamber being in fixed communication with the other of said motor chambers, and means for moving said lever against said biasing means to positively close said vacuum valve, said air valve opening into said control chamber whereby, when said biasing means is overcome by movement of said lever, air pressure will unseat said air valve and admit air into said control chamber.

6. Apparatus constructed in accordance with claim 5 wherein the means for moving said lever comprises a spool axially slidable in said valve body, and means for effecting axial movement of said spool.

7. Apparatus constructed in accordance with claim 5 wherein said valve body surrounds the axis of said pressure responsive unit and said valves are arranged on opposite sides of such axis, said valves being engaged by end portions of said lever, said means for moving said lever being engageable therewith intermediate the ends thereof.

8. Apparatus constructed in accordance with claim 5 wherein said valve body surrounds the axis of said pressure responsive unit and said valves are arranged on opposite sides of such axis, said valves being engaged by end portions of said lever, said means for moving said lever comprising a spool axially slidable in said valve body and having a shoulder engageable therewith to limit its movement in the biased direction of said lever, and a rod for effecting movement of said spool in the other direction to transmit a force to said lever intermediate the ends thereof.

9. A fluid motor comprising a casing, a pressure responsive unit therein including a pair of body members fixed to each other and having cooperating portions forming an internal bore coaxial with said unit, a valve body in said bore, said valve body having an air chamber communicating with the atmosphere and a vacuum chamber communicating with one end of said motor, such end of said motor having means for connecting it with a source of vacuum, said valve body and one of said body members cooperating to form a control chamber, a first valve having a valve seat cooperating therewith to control communication between said control chamber and said air chamber, a second valve having a valve seat cooperating therewith to control communication between said control chamber and said vacuum chamber, said control chamber being in fixed communication with the other end of said motor, said valves being on opposite sides of the axis of said pressure responsive unit, a lever in said control chamber extending diametrically thereof and having end portions respectively engaging said valves, means biasing said lever for movement in one direction to close said first valve and open said second valve, and means for applying a force to said lever intermediate its ends to move it in the other direction to positively close said second valve and release said air valve for movement to open position by air pressure acting thereagainst from said air chamber.

10. Apparatus constructed in accordance with claim 9 wherein said biasing means comprises a pair of springs one of which acts against said lever centrally thereof and the other of which acts against said lever at the end thereof adjacent said air valve and contacting the side of said lever opposite such valve.

11. Apparatus constructed in accordance with claim 9 wherein the means for moving said lever in said other direction comprises a spool axially slidable in said valve body and having a portion engaging said valve body to limit its movement to a normal off position with said first valve closed and said second valve open.

12. A booster brake mechanism comprising a master cylinder, a fluid motor comprising a casing, a pressure responsive unit therein including a pair of body members fixed to each other and having cooperating portions forming a coaxial internal bore, a valve body in said bore having an air chamber communicating with the atmosphere and a vacuum chamber communicating with one end of said motor, such end of said motor having means for connecting it with a source of vacuum, said valve body and one of said body members cooperating to form a control chamber, a first valve having a valve seat cooperating therewith to control communication between said control chamber and said air chamber, a second valve having a valve seat cooperating therewith to control communication between said control chamber and said vacuum chamber, said control chamber being in fixed communication with the other end of said motor, a lever in said control chamber having end portions respectively engaging said valves, means biasing said lever for movement in one direction to close said first valve and open said second valve, means for applying a force to said lever intermediate its ends to move it in the other direction to close said second valve and release said first valve for movement to open position by air pressure acting thereagainst from said air chamber, an axially extending fluid displacing sleeve connected at one end to said pressure responsive unit and having its other end projecting into said master cylinder, and a fluid displacing rod slidable in said sleeve and having one end open to said master cylinder, the other end of said fluid displacing rod extending into said pressure responsive unit and engageable with said force applying means to oppose movement thereof which affects movement of said lever.

13. Apparatus according to claim 12 provided with a thimble in said control chamber mounted on the other end of said fluid displacing rod and having lost motion connection with said force applying means to oppose movement of the latter for moving said lever.

14. Apparatus acocrding to claim 12 provided with a thimble arranged in said control chamber and connected to the other end of said rod, said thimble projecting through said lever and providing a support therefor, said force applying means comprising a spool slidable in said pressure responsive unit and having lost motion connection with said thimble when the latter is in a normal position, said thimble having an end engaging a wall of said control chamber to limit its movement away from said spool to said normal position, said biasing means comprising a compression spring surrounding said thimble and engaging at one end against said thimble to urge it toward said normal position and engaging at its other end against said lever.

References Cited in the file of this patent

UNITED STATES PATENTS

| | | |
|---|---|---|
| 1,846,023 | Bragg | Feb. 23, 1932 |
| 2,005,971 | Edwards | June 25, 1935 |
| 2,438,723 | Stelzer | Mar. 30, 1948 |
| 2,448,981 | Ingres | Sept. 7, 1948 |
| 2,458,803 | Stelzer | Jan. 11, 1949 |

FOREIGN PATENTS

| | | |
|---|---|---|
| 694,840 | Great Britain | July 29, 1953 |